United States Patent
Gateshki et al.

(10) Patent No.: US 10,782,252 B2
(45) Date of Patent: Sep. 22, 2020

(54) APPARATUS AND METHOD FOR X-RAY ANALYSIS WITH HYBRID CONTROL OF BEAM DIVERGENCE

(71) Applicant: Malvern Panalytical B.V., Almelo (NL)

(72) Inventors: Milen Gateshki, Almelo (NL); Detlef Beckers, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 0 days.

(21) Appl. No.: 16/382,606

(22) Filed: Apr. 12, 2019

(65) Prior Publication Data

US 2019/0317031 A1    Oct. 17, 2019

(30) Foreign Application Priority Data

Apr. 13, 2018  (EP) .................................. 18167382
Mar. 8, 2019   (EP) .................................. 19161754

(51) Int. Cl.
| | | |
|---|---|---|
| *G01N 23/20* | (2018.01) | |
| *G01N 23/20008* | (2018.01) | |
| *G01N 23/20016* | (2018.01) | |
| *G01N 23/223* | (2006.01) | |

(52) U.S. Cl.
CPC ....... *G01N 23/20* (2013.01); *G01N 23/20008* (2013.01); *G01N 23/20016* (2013.01); *G01N 23/223* (2013.01); *G01N 2223/056* (2013.01); *G01N 2223/316* (2013.01)

(58) Field of Classification Search
CPC ....... G01N 2223/056; G01N 2223/316; G01N 2223/32; G01N 23/20; G01N 23/20008; G01N 23/20016; G01N 23/201; G01N 23/207; G01N 23/223; G01N 23/20025
See application file for complete search history.

(56) References Cited

U.S. PATENT DOCUMENTS

| | | | | |
|---|---|---|---|---|
| 6,459,769 | B1 * | 10/2002 | Cosman ................... | G21K 1/04 378/147 |
| 7,783,007 | B2 * | 8/2010 | Echner ..................... | G21K 1/04 378/150 |
| 2003/0231737 | A1 * | 12/2003 | Omote ................. | G01N 23/083 378/19 |

(Continued)

FOREIGN PATENT DOCUMENTS

EP    2 896 960    7/2015

*Primary Examiner* — Chih-Cheng Kao
(74) *Attorney, Agent, or Firm* — Leason Ellis LLP

(57) ABSTRACT

An X-ray analysis apparatus and method. The apparatus comprises an adjustable slit (210) between an X-ray source (4) and a sample (6); and optionally a further slit (220, 220a). A controller (17) is configured to control a width of the adjustable slit, between a first width, a larger second width, and an even larger third width. At the first and second widths: the adjustable slit (210) limits the divergence of the incident beam and thereby limits an area of the sample that is irradiated; and the further slit (220) does not limit the divergence of the incident beam. At the third width: the adjustable slit (210) does not limit the divergence of the incident beam, and the further slit (220) limits the divergence of the incident beam and thereby limits the area of the sample that is irradiated. Alternatively, at the third width, the adjustable slit (210) continues to limit the area irradiated.

18 Claims, 8 Drawing Sheets

(56) References Cited

U.S. PATENT DOCUMENTS

| | | | |
|---|---|---|---|
| 2008/0031416 A1* | 2/2008 | Dosho | G01N 23/20 378/81 |
| 2008/0101545 A1* | 5/2008 | Petrik | G21K 1/025 378/148 |
| 2019/0017946 A1* | 1/2019 | Wack | G01N 23/20008 |

* cited by examiner

APPARATUS AND METHOD FOR X-RAY ANALYSIS WITH HYBRID CONTROL OF BEAM DIVERGENCE

CROSS-REFERENCE TO RELATED PATENT APPLICATIONS

The present application claims priority under 35 U.S.C. § 119 to European Patent Application No. 18167382.3, filed Apr. 13, 2018, and European Patent Application No. 19161754.7, filed Mar. 8, 2019, all of which are incorporated by reference, as if expressly set forth in their respective entireties herein.

FIELD OF THE INVENTION

The present invention relates to an apparatus and method for X-ray analysis. Embodiments relate, in particular, to an X-ray diffraction apparatus and a method for making X-ray diffraction measurements.

BACKGROUND

X-ray diffraction is an analytical technique used to characterise material samples. One particular method of X-ray diffraction is the Bragg Brentano method. Other methods for analysing matter using X-rays include Grazing Incidence X-ray Diffraction (GIXRD), Small Angle X-ray Scattering (SAXS), Grazing Incidence Small Angle X-ray Scattering (GISAXS), X-ray micro-diffraction and X-ray Reflectometry. Other types of X-ray analysis include X-ray fluorescence.

In general, an X-ray measurement is carried out by directing X-rays from an X-ray source onto a sample along an incident beam path and detecting X-rays from the sample using an X-ray detector.

X-rays optics such as divergence slits, anti-scatter slits and collimators may be provided on the incident and/or diffracted/scattered beam side. X-ray optics are selected according to the specific method used.

In addition, X-ray measurements are often carried out on a batch of samples. To optimise the quality of the results, the X-ray optics may be chosen specifically for the type of sample to be analysed.

In order to use X-ray analysis equipment for different applications, users must reconfigure the X-ray equipment. This requires expertise. Further, reconfiguring the X-ray equipment is both inconvenient and time consuming.

It is accordingly desirable to provide an X-ray apparatus that is capable of delivering high quality measurements for multiple different applications, with minimal manual reconfiguration.

In the past, a fixed divergence slit has been used in some applications. This creates an irradiated area on the sample that decreases in size with increasing incident beam angle.

In some other applications, a programmable (adjustable) divergence slit has been used. This can allow the beam divergence to be controlled in accordance with the incident beam angle, so that a constant, fixed area of the sample is illuminated as the incident beam angle changes. An anti-scatter slit is typically used behind the adjustable divergence slit (that is, between the adjustable divergence slit and the sample) because the adjustable slit may generate parasitic scatter. However, this anti-scatter slit does not limit the divergence of the incident beam—in other words, it does not block or interfere with the beam itself, it only blocks scattered rays.

SUMMARY

The invention is defined by the claims. According to an aspect of the invention there is provided an X-ray analysis apparatus comprising:

an X-ray source configured to generate X-rays;

a sample stage configured to support a sample, the X-ray source and the sample stage being arranged so that X-rays generated by the X-ray source define an incident beam that irradiates the sample;

an adjustable slit between the X-ray source and the sample;

a further slit between the X-ray source and the adjustable slit or between the adjustable slit and the sample; and a controller configured to control a width of the adjustable slit, wherein the controller is configured to vary the width of the adjustable slit between a first width, a second width, and a third width, the third width being greater than the second width, the second width being greater than the first width, wherein at the first width:
the adjustable slit limits the divergence of the incident beam to a first divergence angle and thereby limits an area of the sample that is irradiated; and
the further slit preferably does not limit the divergence of the incident beam, at the second width:
the adjustable slit limits the divergence of the incident beam to a second divergence angle and thereby limits the area of the sample that is irradiated; and
the further slit preferably does not limit the divergence of the incident beam, and at the third width:
the adjustable slit does not limit the divergence of the incident beam, and
the further slit limits the divergence of the incident beam to a third divergence angle and thereby limits the area of the sample that is irradiated, wherein the third divergence angle is greater than the second divergence angle, and the second divergence angle is greater than the first divergence angle.

The present inventors have recognised that a hybrid system would be advantageous, in which the adjustable slit limits the divergence of the incident beam in certain configurations, and the further slit limits the divergence of the incident beam in some other configurations.

If the further slit is positioned between the adjustable slit and the sample, then, when the adjustable slit is limiting the divergence of the incident beam, the further slit can function as an anti-scatter slit, without blocking or interfering with the incident beam itself.

Conversely, if the further slit is positioned between the X-ray source and the adjustable slit, then the adjustable slit may function as an anti-scatter slit for X-rays scattered by the further slit. In particular, the adjustable slit may function as an anti-scatter slit when the further slit is limiting the divergence of the incident beam.

The incident beam passes through both the adjustable slit and the further slit.

When set to the first width and second width, the adjustable slit blocks part of the incident beam.

When set to the third width, the adjustable slit is preferably outside of the incident beam. That is, at the third width, the adjustable slit preferably does not block or interfere with any part of the incident beam.

The adjustable slit can function as a programmable divergence slit. If the further slit is positioned between the adjustable slit and the sample, then, when the adjustable slit is set to the first width and the second width, the further slit can function as an anti-scatter slit. When the adjustable slit is set to the third width, the further slit can function as a divergence slit.

The apparatus will typically further comprise an X-ray detector, arranged to receive X-rays from the sample. In various different cases, these may be diffracted X-rays, scattered X-rays, or X-rays generated by fluorescence in the sample.

In some embodiments, the further slit is a non-adjustable slit.

If the non-adjustable further slit is positioned between the adjustable slit and the sample, then, when the adjustable slit is set to the first width and the second width, the non-adjustable further slit can function as a fixed anti-scatter slit. When the adjustable slit is set to the third width, the non-adjustable further slit can function as a fixed divergence slit.

Because the non-adjustable slit does not need to be clear of the beam in all configurations of the adjustable slit, the non-adjustable slit can have a narrower width than was the case previously when combining a programmable divergence slit with an anti-scatter slit. This narrower width can allow improved suppression of scattering, when the adjustable slit is controlling the beam divergence.

If the non-adjustable further slit is positioned between the X-ray source and the adjustable slit, then, when the adjustable slit is set to the third width, the adjustable slit can function as an adjustable anti-scatter slit.

In other embodiments, the further slit may be an adjustable slit.

The X-ray analysis apparatus may further comprise a goniometer, wherein the X-ray source is mounted to the goniometer so as to irradiate the sample at a range of different incident angles. In some embodiments, the X-ray source may be rotatable about an axis of the goniometer. Alternatively or in addition, the sample stage may be rotated so that sample is irradiated at the range of different incident angles.

The controller may be configured to control the goniometer and the adjustable slit so that: with the goniometer set to a first incident angle, the adjustable slit is set to the first width; with the goniometer set to a second incident angle, the adjustable slit is set to the second width; and with the goniometer set to a third incident angle, the adjustable slit is set to the third width, the third incident angle being greater than the second incident angle, and the second incident angle being greater than the first incident angle.

The third angle is therefore the highest angle of incidence and the first angle is therefore the lowest angle of incidence. The second angle is in between the first and third angles.

The controller may be configured to control the width of the adjustable slit such that, over a range of incident angles of the goniometer, the incident beam irradiates a constant area of the sample.

In particular, the controller may control the width of the adjustable slit so that the incident beam irradiates a constant area of the sample at the first angle and the second angle.

In this way, the apparatus can operate in a first mode at low angles, and in a second mode at high angles. In the first mode, the incident beam illuminates a fixed length of the sample (that is, a constant area is irradiated), by controlling the width of the adjustable slit in accordance with the angle of the goniometer. In the second mode, the incident beam has a fixed divergence, controlled by the further slit.

In the first mode, the controller controls the adjustable slit to open wider as the incident beam angle increases.

The apparatus can alternatively operate in the two different modes for two different types of measurement.

The X-ray analysis apparatus may further comprise an X-ray detector arranged to receive X-rays from the sample and configured to produce an output signal measuring the intensity of the received X-rays. The controller is optionally configured to receive the output signal from the X-ray detector and configured to normalise the measured intensity, by: performing a first normalisation calculation based on the width of the adjustable slit, when the adjustable slit is set to the first width or the second width; and performing a second normalisation calculation based on a width of the further slit, when the adjustable slit is set to the third width.

In this way, the controller can automatically correct for the effect of the different slits on the intensity of the detected X-rays.

In some embodiments, the X-ray analysis apparatus may be configured for X-ray fluorescence measurements.

In some embodiments, the X-ray analysis apparatus may be a diffractometer.

The apparatus is preferably configured for powder diffractometry.

According to another aspect of the invention, there is provided a method of X-ray analysis, using an apparatus comprising:

an X-ray source configured to generate X-rays;

a sample stage configured to support a sample, the X-ray source and the sample stage being arranged so that X-rays generated by the X-ray source define an incident beam that irradiates the sample;

an adjustable slit between the X-ray source and the sample;

a further slit between the X-ray source and the adjustable slit or between the adjustable slit and the sample; and a controller configured to control a width of the adjustable slit, the method comprising:

setting, by the controller, the adjustable slit to a first width, at which the adjustable slit limits the divergence of the incident beam to a first divergence angle and thereby limits an area of the sample that is irradiated, and the further slit preferably does not limit the divergence of the incident beam;

setting, by the controller, the adjustable slit to a second width, at which the adjustable slit limits the divergence of the incident beam to a second divergence angle and thereby limits an area of the sample that is irradiated, and the further slit preferably does not limit the divergence of the incident beam; and setting, by the controller, the adjustable slit to a third width, at which the adjustable slit does not limit the divergence of the incident beam, and the further slit limits the divergence of the incident beam to a third divergence angle and thereby limits an area of the sample that is irradiated, wherein the third width is greater than the second width, and the second width is greater than the first width, and wherein the third divergence angle is greater than the second divergence angle, and the second divergence angle is greater than the first divergence angle.

The further slit may be a non-adjustable slit.

Optionally, the controller sets the adjustable slit to the first width when the incident beam irradiates the sample at a first incident angle; the controller sets the adjustable slit to the second width when the incident beam irradiates the sample at a second incident angle; and the controller sets the adjustable slit to the third width when the incident beam irradiates the sample at a third incident angle, wherein the third incident angle is greater than the second incident angle, and the second incident angle is greater than the first incident angle.

The controller may control the width of the adjustable slit such that, over a range of incident angles, the incident beam irradiates a constant area of the sample.

The method may further comprise: detecting X-rays in a secondary beam scattered, diffracted, or emitted by the sample; measuring an intensity of the X-rays in the secondary beam; and normalising the measured intensity to produce a normalised intensity, comprising: performing a first normalisation calculation based on the width of the adjustable slit, when the adjustable slit is set to the first width or the second width; and performing a second normalisation calculation based on a width of the further slit, when the adjustable slit is set to the third width.

According to still another aspect of the invention, there is provided a method of X-ray analysis, using an apparatus comprising:

an X-ray source configured to generate X-rays;

a sample stage configured to support a sample, the X-ray source and the sample stage being arranged so that X-rays generated by the X-ray source define an incident beam that irradiates the sample;

an adjustable slit between the X-ray source and the sample;

a goniometer, wherein the X-ray source is mounted to the goniometer so as to be rotatable about an axis of the goniometer, to irradiate the sample at a range of different incident angles; and a controller configured to control the goniometer and a width of the adjustable slit, the method comprising:

with the goniometer set to a first incident angle, setting, by the controller, the adjustable slit to a first width, at which the adjustable slit limits the divergence of the incident beam to a first divergence angle and thereby limits an area of the sample that is irradiated;

with the goniometer set to a second incident angle, setting, by the controller, the adjustable slit to a second width, at which the adjustable slit limits the divergence of the incident beam to a second divergence angle and thereby limits an area of the sample that is irradiated;

with the goniometer set to a third incident angle, setting, by the controller, the adjustable slit to a third width, at which the adjustable slit limits the divergence of the incident beam to a third divergence angle and thereby limits an area of the sample that is irradiated; and with the goniometer set to a fourth incident angle, setting, by the controller, the adjustable slit to the third width, wherein the third width is greater than the second width, and the second width is greater than the first width, wherein the third divergence angle is greater than the second divergence angle, and the second divergence angle is greater than the first divergence angle, and wherein the fourth incident angle is greater than the third incident angle, the third incident angle is greater than the second incident angle, and the second incident angle is greater than the first incident angle.

According to this aspect, the adjustable slit is adjusted to first and second different widths at the first and second incident angles, respectively. At the third and fourth incident angles, the width of the adjustable slit is fixed at the third width. In this way, the adjustable slit can perform the functions of both a fixed slit and an adjustable slit. This may reduce the need for a further slit, in some embodiments. At the third and fourth incident angles, the adjustable slit is controlled to limit the divergence of the incident beam to a fixed divergence angle—namely, the third divergence angle.

The controller may control the width of the adjustable slit such that, over a range of incident angles from the first incident angle to the second incident angle, the incident beam irradiates a constant area of the sample.

In this way, the adjustable slit is controlled to provide a constant irradiation area on the sample at low incident angles, and to provide constant divergence at higher incident angles.

The apparatus optionally comprises a further slit. The further slit may be a non-adjustable slit.

The further slit may be positioned between the adjustable slit and the sample so that the incident beam passes through the further slit but the further slit does not limit the divergence of the incident beam.

The further slit preferably functions as an anti-scatter slit. In particular, it may be configured to block scatter generated by the adjustable slit.

Also provided is a computer program comprising computer program code configured to cause a controller of an X-ray analysis apparatus to carry out all the steps of a method as summarised above when said computer program is run on said controller. The computer program may be embodied on a non-transitory computer-readable medium.

According to still another aspect of the invention, there is provided an X-ray analysis apparatus comprising:

an X-ray source configured to generate X-rays;

a sample stage configured to support a sample, the X-ray source and the sample stage being arranged so that X-rays generated by the X-ray source define an incident beam that irradiates the sample;

an adjustable slit between the X-ray source and the sample;

a goniometer, wherein the X-ray source is mounted to the goniometer so as to irradiate the sample at a range of different incident angles; and a controller configured to control the goniometer and a width of the adjustable slit, wherein the controller is configured to vary the width of the adjustable slit between a first width, a second width, and a third width, the third width being greater than the second width, the second width being greater than the first width, wherein at the first width:
the adjustable slit limits the divergence of the incident beam to a first divergence angle and thereby limits an area of the sample that is irradiated, at the second width:
the adjustable slit limits the divergence of the incident beam to a second divergence angle and thereby limits the area of the sample that is irradiated, and at the third width:
the adjustable slit limits the divergence of the incident beam to a third divergence angle and thereby limits the area of the sample that is irradiated, wherein the third divergence angle is greater than the second divergence angle, and the second divergence angle is greater than the first divergence angle, wherein the controller is configured to control the goniometer and the adjustable slit so that:

with the goniometer set to a first incident angle, the adjustable slit is set to the first width;

with the goniometer set to a second incident angle, the adjustable slit is set to the second width;

with the goniometer set to a third incident angle, the adjustable slit is set to the third width; and with the goniometer set to a fourth incident angle, the adjustable slit is set to the third width, the fourth incident angle being greater than third incident angle, the third incident angle being greater than the second incident angle, and the second incident angle being greater than the first incident angle.

The X-ray analysis apparatus may further comprise an X-ray detector arranged to receive X-rays from the sample and configured to produce an output signal measuring the intensity of the received X-rays. The controller is optionally configured to receive the output signal from the X-ray detector and configured to normalise the measured intensity, by: performing a normalisation calculation based on the width of the adjustable slit, when the adjustable slit is set to the first width, the second width, or the third width.

BRIEF DESCRIPTION OF THE DRAWINGS

Embodiments of the present invention will now be described, by way of example, with reference to the accompanying drawings, in which.

Figure 1:
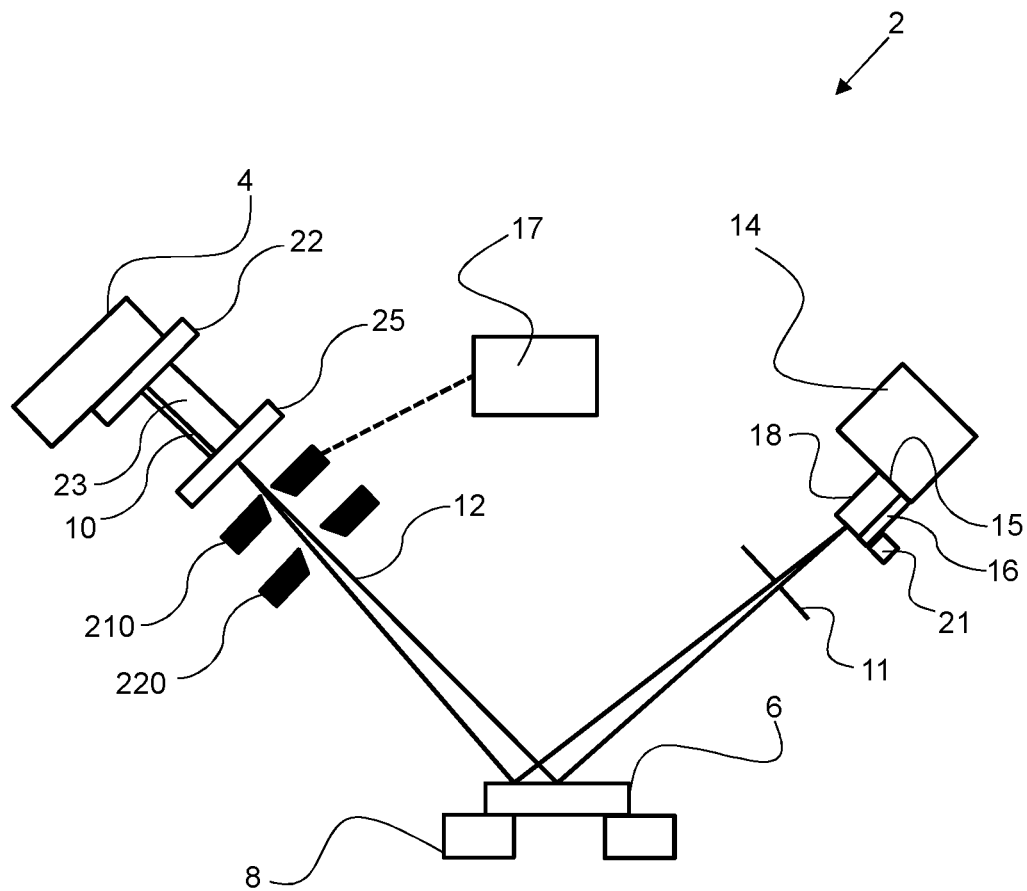
FIG. 1 is a schematic diagram of an X-ray diffraction apparatus, in a cross sectional side view, according to an embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1 shows a schematic diagram of an X-ray diffractometer according to one exemplary embodiment of the invention.

Referring to FIG. 1, the X-ray apparatus 2 includes an X-ray source (X-ray tube 4) which is arranged to generate X-rays and direct them towards a sample 6 supported by a sample stage 8. A flat graded multilayer 10 is provided in the path of the X-ray beam 12 between the X-ray tube 4 and the sample stage 8. As described in EP 2 896 960, by providing the flat graded multi-layer it is possible to use the X-ray apparatus for both Bragg Brentano and SAXS measurements.

The X-ray tube 4 has a line focus, which creates a diverging X-ray beam 12 incident on the flat graded multilayer, and eventually the sample 6. The sample 6 diffracts the incident X-ray beam 12. An X-ray detector 14 having an X-ray detection region 15 is arranged to detect X-rays from the sample that that are diffracted along a diffracted X-ray beam path towards X-ray detection region 15. The X-ray detector 14 and the X-ray tube are mounted to a goniometer (not shown). The angle of the incident X-ray beam, θ, is changed by rotating the X-ray tube about an axis. The X-ray detector is rotated about the same axis, to detect X-rays diffracted by the sample at an angle 2θ relative to the incident X-ray beam. A first support component 16 for one or more collimators is provided between the sample stage 8 and the X-ray detector 14. The X-ray detector can be operated in a 2D mode, a 1D mode or a 0D mode, by selecting how the active area of the detection region 15 is read out. For Bragg Brentano measurements, the 1D mode is used.

The X-ray apparatus further comprises a controller 17, for controlling the positions and configurations of the various components. The controller 17 is in communication with a first actuator 21. The first actuator 21 is arranged to alter the position of the first support component 16, to move the one or more collimators.

In the embodiment illustrated in FIG. 1, the first support component 16 supports a first collimator 18 and a second collimator (not shown). The first collimator 18 allows beams having an angular divergence within a first range of angles to pass through it. The second collimator has an angular divergence that is larger than the first collimator 18, and accordingly allows broader beams to pass through it.

By providing an arrangement in which the controller 17 causes the first support component 16 to move between the first configuration and the second configuration, it is possible to reconfigure the X-ray apparatus in a convenient way. The first collimator 18 is exchanged for the second collimator by moving the first support component 16 between the first configuration and the second configuration. Furthermore, by providing an arrangement in which the first support component 16 is arranged to move axially, it is possible to change the configuration of the first support component without interrupting the angular range, 2θ, of the detector.

At the same time, by providing an arrangement in which the first support component 16 is arranged to move relative to the X-ray detector 14, across the beam path in a lateral (axial direction) a compact arrangement is provided.

A programmable anti-scatter slit 11 is provided in the secondary X-ray beam path from the sample 6 to the detection region 15 of the detector 14. The controller 17 is configured to control the size of the opening of the programmable anti-scatter slit, so that the size of the slit can be altered depending on the type of measurement being conducted.

A beam mask component 22 is provided on the incident beam side. In this embodiment, the beam mask component comprises a first mask wheel. A beam-conditioning unit 23 and a second mask wheel 25 are provided after the first mask wheel, in a direction from the first mask wheel towards the sample. The beam-conditioning unit 23 comprises the flat graded multilayer 10 and a Soller slit collimator fixed to the flat graded multilayer 10. The flat graded multilayer 10 reflects the incident X-ray beam, without altering the divergence of the beam.

In one embodiment, the beam mask component 22 comprises a mask wheel. The arrangement of FIG. 1 also includes a second mask wheel 25. Each mask wheel comprises a body and has a plurality of masks formed in the body. Each mask wheel is rotatable about its centre. The first mask wheel comprises at least a first slit mask and an open beam mask. The first slit mask is for limiting the size of the beam (potentially in combination with other components). The open beam mask is a large opening that is sized so as to allow X-ray beam to pass through uninterrupted. The first mask wheel may additionally comprise one or multiple further slit masks and/or an attenuator. The controller 17 may be configured to control the position of the beam mask component.

By providing this arrangement, the beam optics in the incident beam path can be conveniently reconfigured. Accordingly, the X-ray apparatus can be used for multiple different applications, since different combinations of incident and diffracted beam optics can be provided, without the need for an expert user to carry out extensive work in order to reconfigure the apparatus.

According to an embodiment of the invention, the X-ray analysis apparatus comprises an adjustable slit 210 in the incident beam path between the X-ray tube 4 and the sample 6; and a non-adjustable further slit 220 in the incident beam path between the adjustable slit 210 and the sample 6. The adjustable slit 210 can function as a programmable divergence slit, under the control of the controller 17 (as illustrated by the dashed line in FIG. 1). The non-adjustable slit 220 can function as an anti-scatter slit (especially in conjunction with the adjustable slit 210) and/or it can function as a fixed divergence slit.

Figure 2:
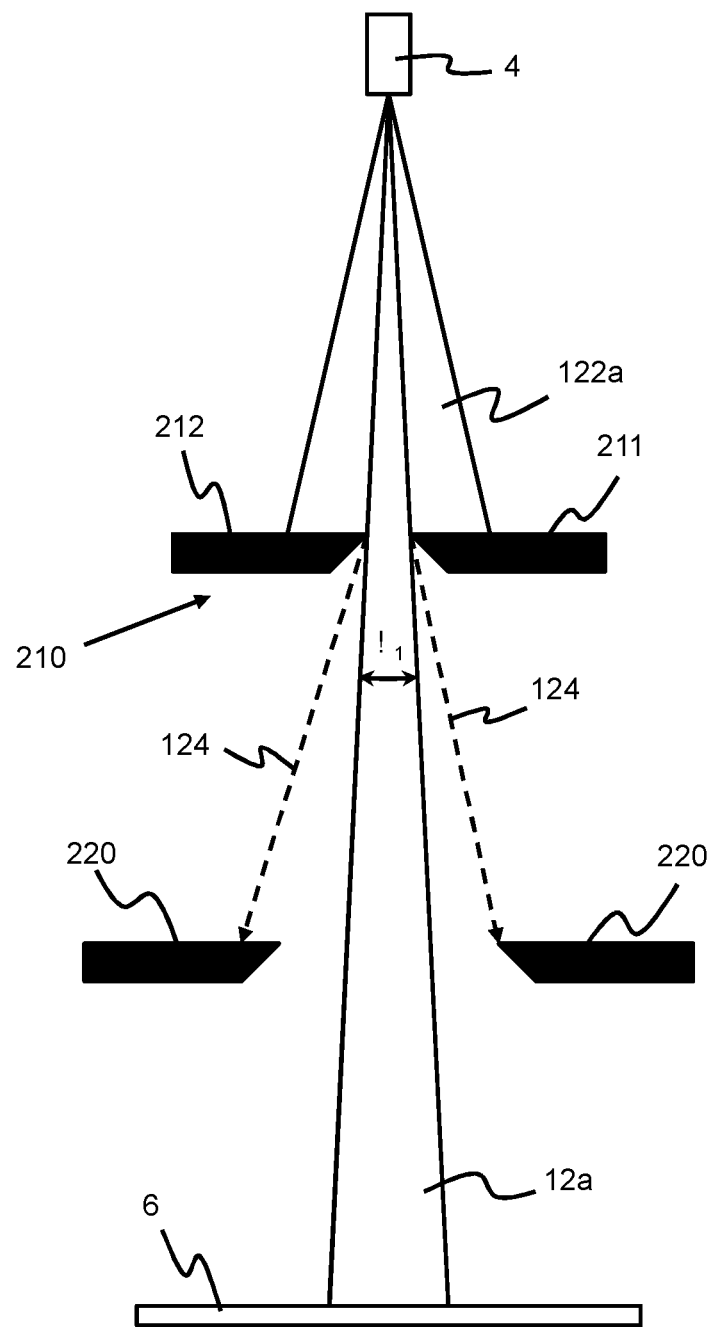
FIG. 2 is a simplified schematic diagram illustrating beam formation in the X-ray diffraction apparatus of FIG. 1, with a programmable divergence slit set to a first width.
Figure 3:
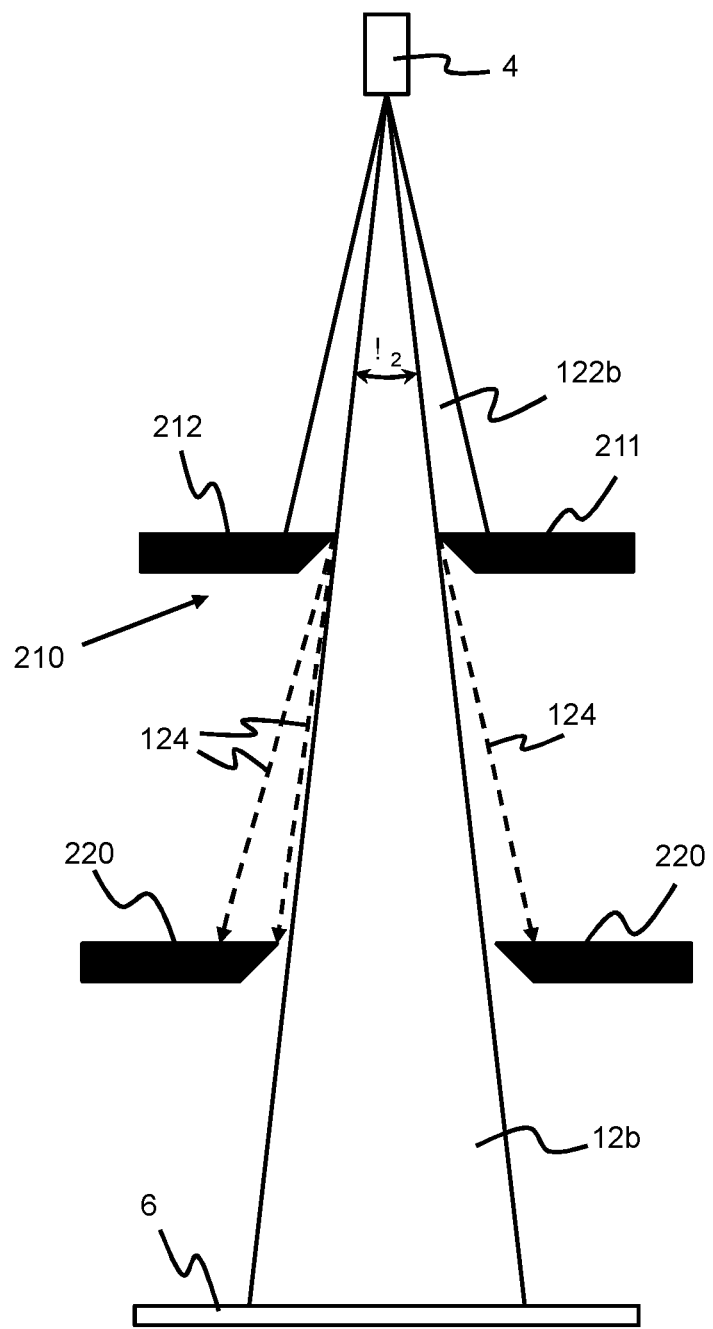
FIG. 3 is a simplified schematic diagram illustrating beam formation in the X-ray diffraction apparatus of FIG. 1, with a programmable divergence slit set to a second width.
Figure 4:
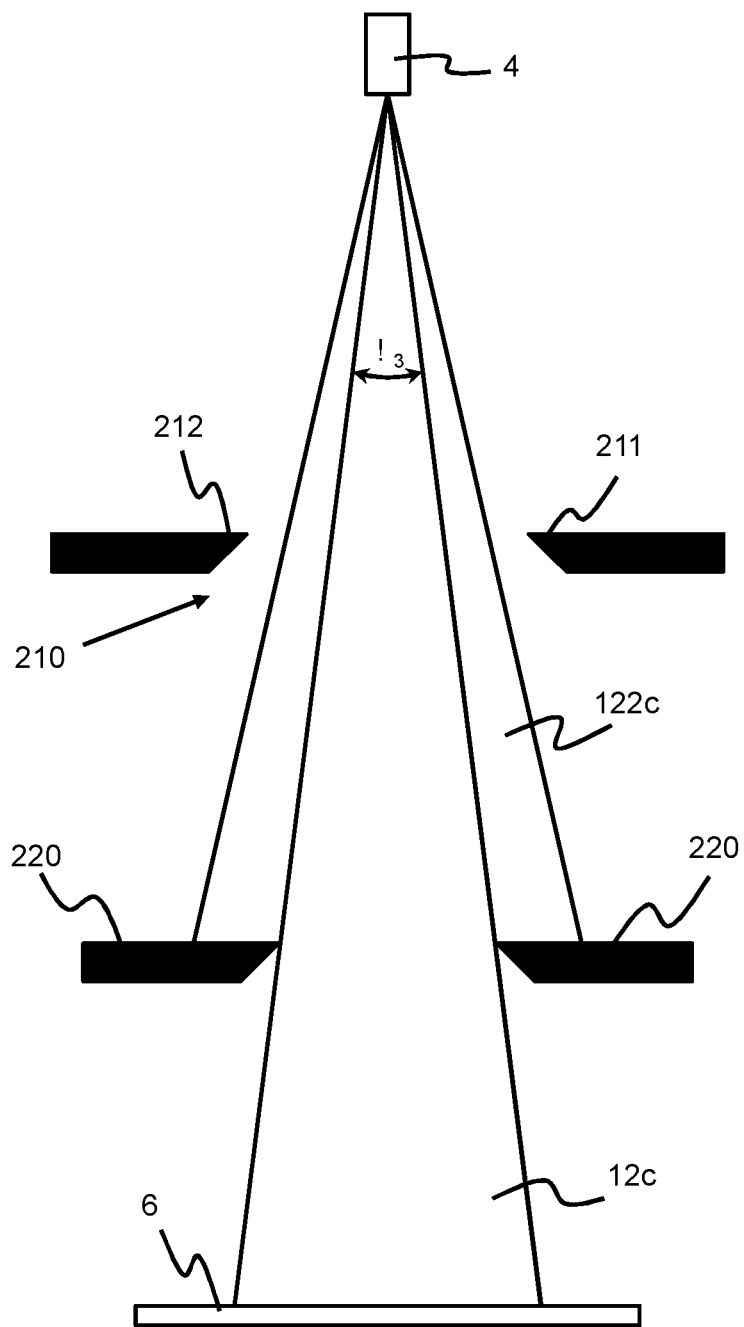
FIG. 4 is a simplified schematic diagram illustrating beam formation in the X-ray diffraction apparatus of FIG. 1, with a programmable divergence slit set to a third width.

The cross-sectional drawings in FIGS. 2-4 provide a schematic illustration of an operating principle of the slits 210 and 220, according to an embodiment of the invention. FIG. 2 shows the adjustable slit 210 when it has been set by the controller 17 to a first width. The adjustable slit 210 is formed of two mutually opposing blades 211 and 212. The width of the adjustable slit is defined by the spacing between these two blades. With the adjustable slit 210 at the first width, the adjustable slit limits the divergence of the incident beam to a first divergence angle $\alpha_1$. It does this by the blades 211 and 212 blocking a portion 122*a* of the beam. The first divergence angle $\alpha_1$ is the divergence of the remaining portion 12*a* of the incident beam that is allowed to pass through the gap between the two blades. By limiting the divergence in this way, the adjustable slit limits the area of the sample 6 that is irradiated by the incident beam.

With the adjustable slit 210 at the first width, the non-adjustable slit 220 does not interfere with the remaining portion 12*a* of the incident beam. In this embodiment, the non-adjustable slit 220 comprises an opening in a solid plate of material. The width of the slit, which is fixed, is defined by the space between opposing sides of the opening. In the configuration shown in FIG. 2—that is, with the adjustable slit 210 set to the first width—the remaining portion 12*a* of the incident beam passes through the opening without the opposing sides of the opening interfering with it or blocking it. However, the non-adjustable slit 220 is still useful in this configuration as an anti-scatter slit. Parasitic scatter from the adjustable slit 210 can be blocked by the two opposing sides of the solid plate. This is illustrated in FIG. 2 by the scattered rays 124 (indicated with dashed arrows), which are blocked by the non-adjustable slit 220 and thereby prevented from reaching the sample.

FIG. 3 shows the adjustable slit 210 when it has been set by the controller 17 to a second width, greater than the first width. At the second width, the adjustable slit 210 limits the divergence of the incident beam to a second divergence angle $\alpha_2$, which is greater than the first divergence angle $\alpha_1$.

The opposing blades 211 and 212 block a portion 122*b* of the beam to do this. A remaining portion 12*b* of the beam passes through the adjustable slit 210 to irradiate the sample 6. Once again, by limiting the divergence of the incident beam, the adjustable slit 210 limits the area of the sample 6 that is irradiated.

With the adjustable slit 210 at the second width, the non-adjustable slit 220 still does not interfere with the remaining portion 12*b* of the incident beam. That is, the beam passes cleanly through the opening of the non-adjustable slit 220 without being blocked or interfered with. However, once again, the non-adjustable slit 220 can function as an anti-scatter slit, by blocking rays 124 of parasitic scatter generated by the adjustable slit 210.

FIG. 4 shows the adjustable slit 210 when it has been set by the controller 17 to a third width, greater than the first and second widths. At this third width, the adjustable slit 210 does not interfere with or block any part of the incident beam and thus does not limit its divergence. However, as illustrated in the drawing, the non-adjustable slit 220 now blocks a portion 122*c* of the beam and thereby limits the divergence of the incident beam to a third divergence angle $\alpha_3$, which is greater than the first and second divergence angles $\alpha_1$ and $\alpha_2$. Therefore, with the adjustable slit 210 at the third width, the non-adjustable slit 220 limits the area of the sample that is irradiated. This area is irradiated by the remaining portion 12*c* of the incident beam. Since the adjustable slit 210 does not interfere with the beam in this configuration, it does not generate any parasitic scatter.

Note that FIGS. 2-4 show a simplified, exaggerated geometry and are not intended to be scale drawings—they are only intended to explain the principles of operation of the two slits 210 and 220. Also, for simplicity of explanation, FIGS. 2-4 show the incident beam being directed vertically downwards onto the sample in all three cases. In practice, it is more likely that the incident angle on the sample will change, and the incident beam divergence will be controlled according to the incident angle, by changing the width of the adjustable slit 210. Such a case is illustrated in FIG. 5.

In some embodiments, the apparatus further comprises a goniometer (not shown) and the X-ray tube 4 (and incident beam X-ray optics) are mounted to the goniometer so as to be rotatable about the axis of the goniometer. The sample is positioned on the sample stage 8 so as to be aligned with the axis of the goniometer. The X-ray detector 14 (and secondary beam X-ray optics) are also mounted to the goniometer so that they are rotatable about its axis. In one embodiment, the controller controls the goniometer and the adjustable slit 210 in conjunction with one another so that the adjustable slit 210 opens wider with increasing incident angle.

Figure 5:
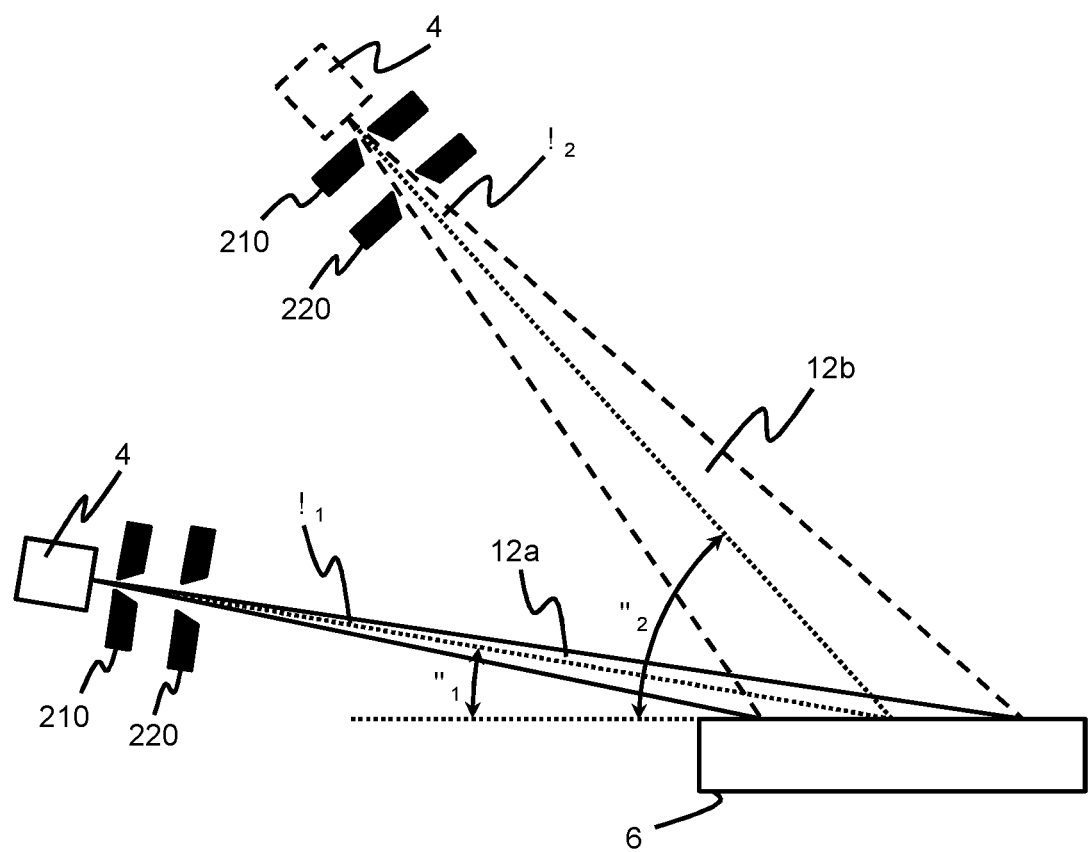
FIG. 5 illustrates a procedure for irradiating a constant area of a sample with the incident beam, by varying the beam divergence in conjunction with the incident angle.

A particularly preferred example of this is shown in FIG. 5. When the goniometer is set to a first incident angle $\theta_1$, the controller sets the adjustable slit 210 to the first width, so as to produce an incident beam 12*a* having the first divergence angle thus the $\alpha_1$. On the other hand, when the goniometer is set to a second, higher incident angle $\theta_2$ (as indicated by the second position of the X-ray tube 4, in dashed lines), the controller sets the adjustable slit 210 to the second width, so as to produce an incident beam 12*b* having the second, wider divergence angle $\alpha_2$. The width of the adjustable slit 210, and thus the divergence angle $\alpha$ of the beam, are controlled so that the same, constant area of the sample is irradiated at both incident angles. Although FIG. 5 illustrates this for only two incident angles, it will be apparent to those skilled in the art that the adjustable slit 210 can be controlled to provide this constant area of irradiation over a continuous range of incident angles.

At a third, higher incident angle (not shown in FIG. 5), the adjustable slit 210 is set to the third width, such that the opposing blades 211 and 212 are moved completely out of the incident beam, and the non-adjustable slit 220 takes over from the adjustable slit 210 to set the beam divergence. Once the non-adjustable slit 220 takes over, the divergence of the beam is fixed. This may be advantageous for measurements over a range of higher incident angles.

Typically, to conduct the X-ray analysis, the sample 6 is scanned at a range of incident angles θ (and corresponding angles of the secondary beam, detected by the detector 14). Since the slits 210 and 220 are controlling the divergence of the beam by blocking part of it, the total amount of radiation falling on the sample is changing over different incident angles—even though the area irradiated may be held constant over a particular range of angles by control of the adjustable slit 210. This causes a variation in the total intensity of the X-rays received by the X-ray detector 14. To enable it to compensate for this, the controller may receive an output signal from the X-ray detector 14, measuring the intensity of X-rays received by the detector 14. The controller may be configured to normalise the measured intensity according to the incident angle for which it was measured. In particular, the controller 17 may be configured to normalise the measured intensity according to the width of the adjustable slit 210, when the adjustable slit is controlling the beam divergence, and to normalise the measured intensity according to the width of the further slit 220, when the further slit is controlling the beam divergence. In this way, the controller can automatically compensate for variations in the measured X-ray intensity caused by the hybrid divergence control system.

Note that, in some embodiments, the compensation need not be performed by the controller 17. It may be performed by hardware, software, or firmware of another processor (not shown), separate from the controller 17. In this case, this other processor preferably receives information about the configuration of the slits 210 and 220, together with the measured intensity to be normalised.

Figure 6:
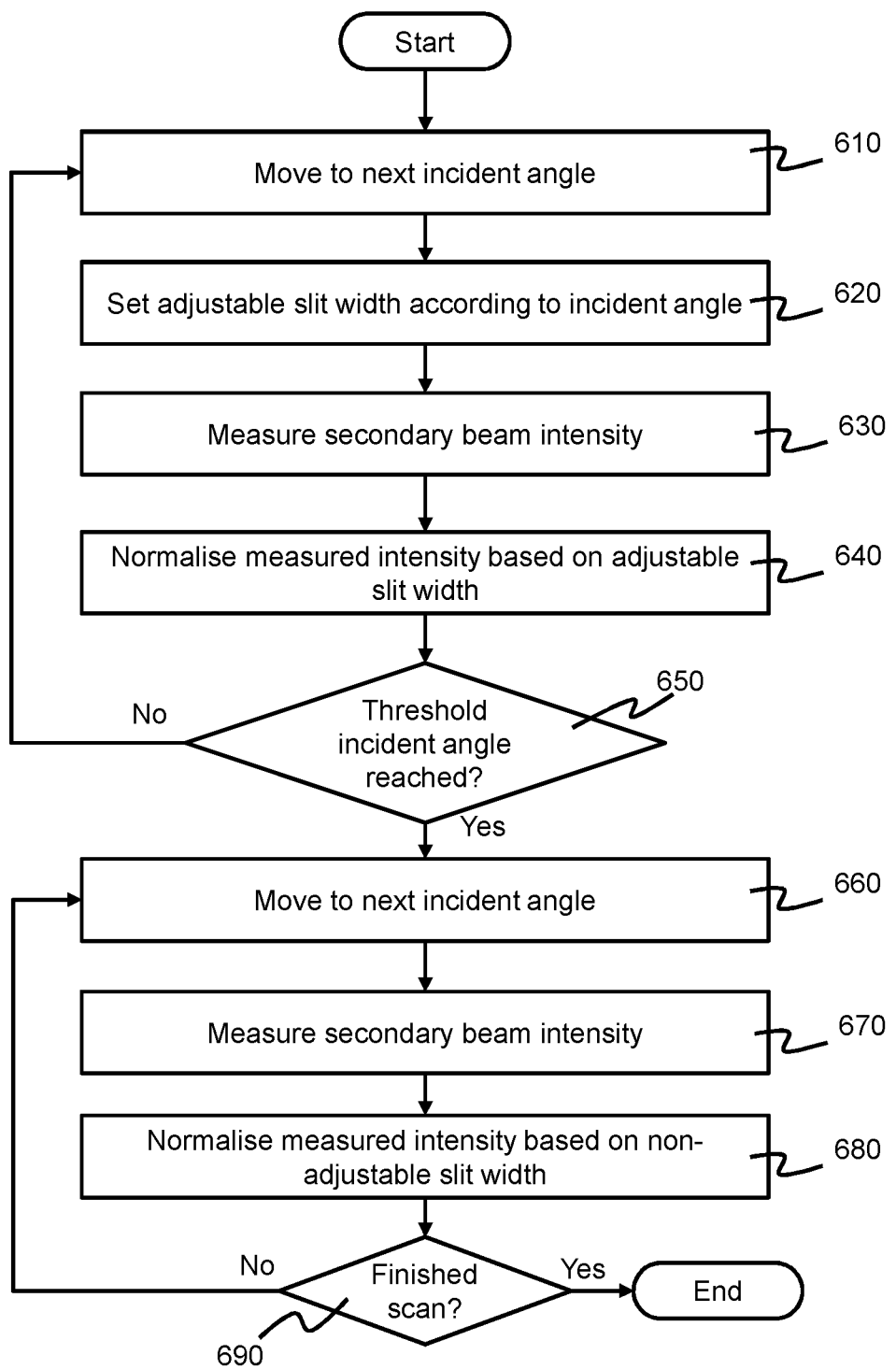
FIG. 6 is a flowchart illustrating a method for making X-ray measurements, according to an embodiment of the invention.

FIG. 6 illustrates a method of X-ray analysis that can be carried out according to an embodiment of the invention, using an X-ray analysis apparatus as described above.

When the method starts, the first incident angle to be measured is set in step 610. Next, in step 620, the controller 17 sets the width of the adjustable slit 210 according to the incident angle θ. This may correspond to the first width and first incident angle $\theta_1$ described previously above. In this configuration, the adjustable slit 210 is controlling the divergence of the beam. In step 630, the intensity of the secondary beam is measured using the X-ray detector 14. In step 640, the measured intensity is normalised (using either the controller 17 or another processor), based on the width of the adjustable slit 210, to compensate for the absence of the blocked portion 122a of the beam.

In step 650, the method checks whether a threshold incident angle has been reached. This threshold angle corresponds to the point at which the non-adjustable slit 220 takes over from the adjustable slit 210 to control the beam divergence. If the threshold angle has not been reached yet, the method returns to step 610 and the controller 17 controls the goniometer to move to the next incident angle. This may be the second incident angle $\theta_2$ described above. In this configuration, the adjustable slit 210 is still controlling the divergence of the beam. Steps 620, 630, and 640 are repeated. This time, in step 640, the measured intensity is normalised based on the width of the adjustable slit 210, to compensate for the absence of the blocked portion 122b of the beam.

When the threshold incident angle is reached, the method proceeds to step 660, and the controller 17 controls the goniometer to move to the next incident angle. The method is now in a constant angular divergence mode, wherein the divergence of the incident beam is controlled by the non-adjustable slit 220. The blades of the adjustable slit 210 are no longer interfering with the incident beam. Therefore, there is no longer any need to set the width of the adjustable slit 210 in accordance with the incident angle. The method proceeds directly to step 670, in which the secondary beam intensity is measured. This step is substantially identical to step 630, apart from the manner in which the divergence of the incident beam is controlled. In step 680, the measured intensity is normalised (using either the controller 17 or another processor), based on the (fixed) width of the non-adjustable slit 220, in order to compensate for the absence of the blocked portion 122c of the beam.

In step 690, the method checks whether there are further incident angles to scan. If so, the method returns to step 660 and repeats steps 670 and 680. When there are no more incident angles to be scanned, the method terminates.

Using such a method can allow a scan to be conducted automatically, with the incident beam divergence (and thereby the area of the sample that is irradiated) being controlled to give the best measurement results, over a wide range of angles, and using different types of divergence control. The results are automatically normalised, so that the use of the different modes of divergence control is transparent to the user. This may help to avoid the need for complicated post-processing of the results by an expert user.

Note that, as well as using multiple modes of divergence-control in the same scan, on the same sample (as described above), an apparatus according to embodiments of the present invention can be used to perform different scans in different modes. For example, the apparatus may be programmed to perform one type of scan using the non-adjustable slit 220 to control the divergence of the incident beam. The apparatus may be programmed to perform another type of scan using the adjustable slit 210. This latter type of scan may be performed with the adjustable slit 210 set to a constant width (and therefore constant divergence) over a range of incident angles, or with the width of the adjustable slit 210 (and therefore the divergence) varying according to incident angle.

Figure 6A:
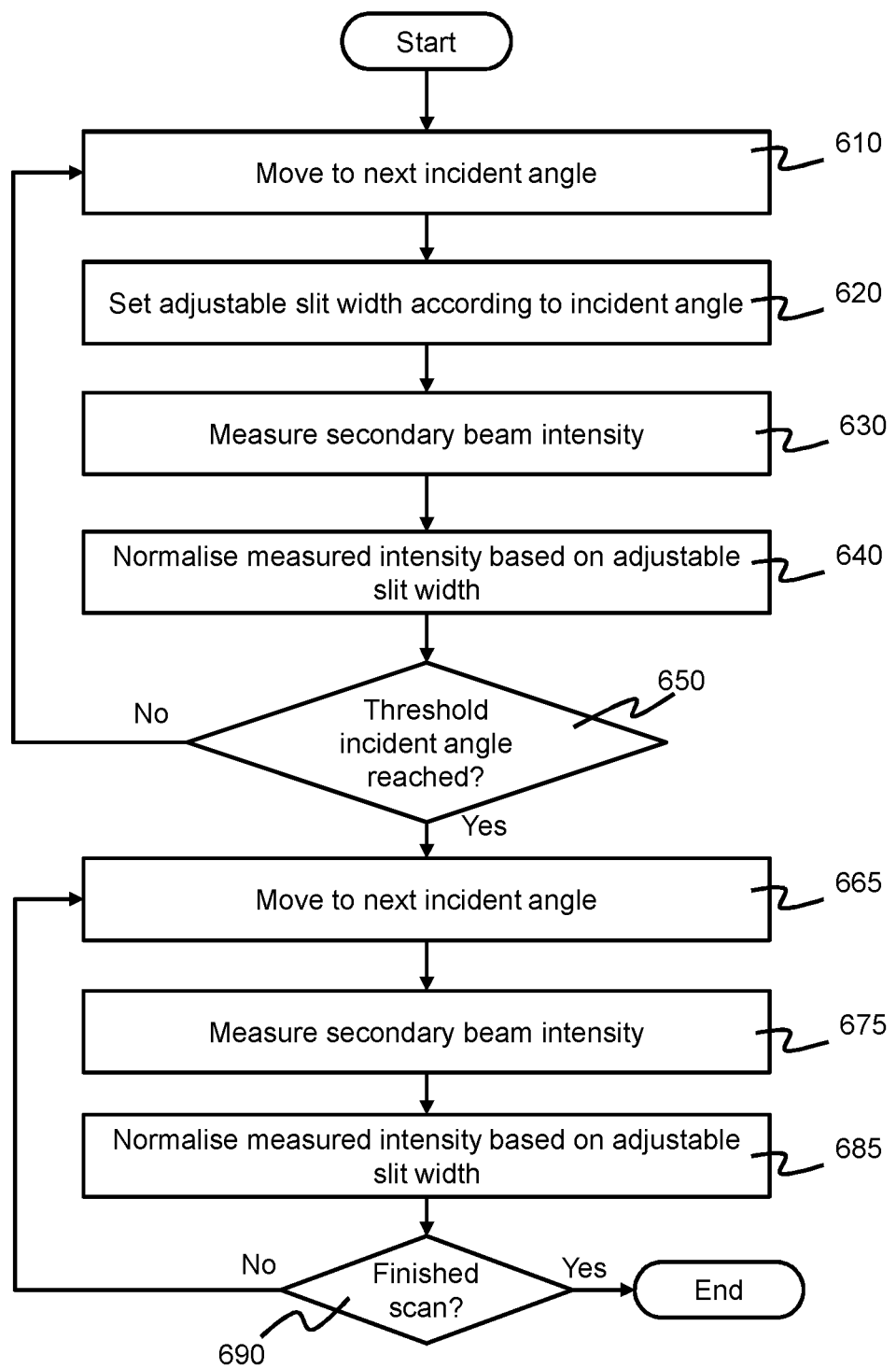
FIG. 6A is a flowchart for a method that is a variant of the one illustrated in FIG. 6.

FIG. 6A is a flowchart illustrating a variant of the method of FIG. 6. In this variant, the width of the adjustable slit 210 is varied at some angles of incidence, and kept constant at other angles. In particular, it is varied at lower angles, and kept constant at higher angles. The method of this embodiment can be performed with just the adjustable slit 210, if so desired. In other words, the further slit 220 is optional in this embodiment.

Steps 610 to 650 in the method of FIG. 6A are the same as those of FIG. 6. In this embodiment, the threshold incident angle is still the angle at which the measurement switches to a constant angular divergence mode. However, unlike the method of FIG. 6, the adjustable slit 210 will remain responsible for controlling the divergence of the beam in this constant divergence mode. Once the threshold incident angle is reached, the method proceeds to step 665 and the controller 17 controls the goniometer to move to the next incident angle. In the present embodiment, it is assumed that the width of the adjustable slit will remain fixed at the final width that was set in the final iteration of step 620; therefore, there is no need to modify the width after step 665. However, it will be understood that, in other embodiments, the adjustable slit 210 may be set to a predetermined different fixed width, once the threshold incident angle has been reached. In step 675, the secondary beam intensity is measured. In step 685, the measured intensity is normalised (using either the controller 17 or another processor), based on the width of the adjustable slit 210, in order to compensate for the absence of the blocked portion 122*b* of the beam. In step 690, the method checks whether there are further incident angles to scan. If so, the method returns to step 665 and repeats steps 675 and 685. When there are no more incident angles to be scanned, the method terminates.

Figure 7:
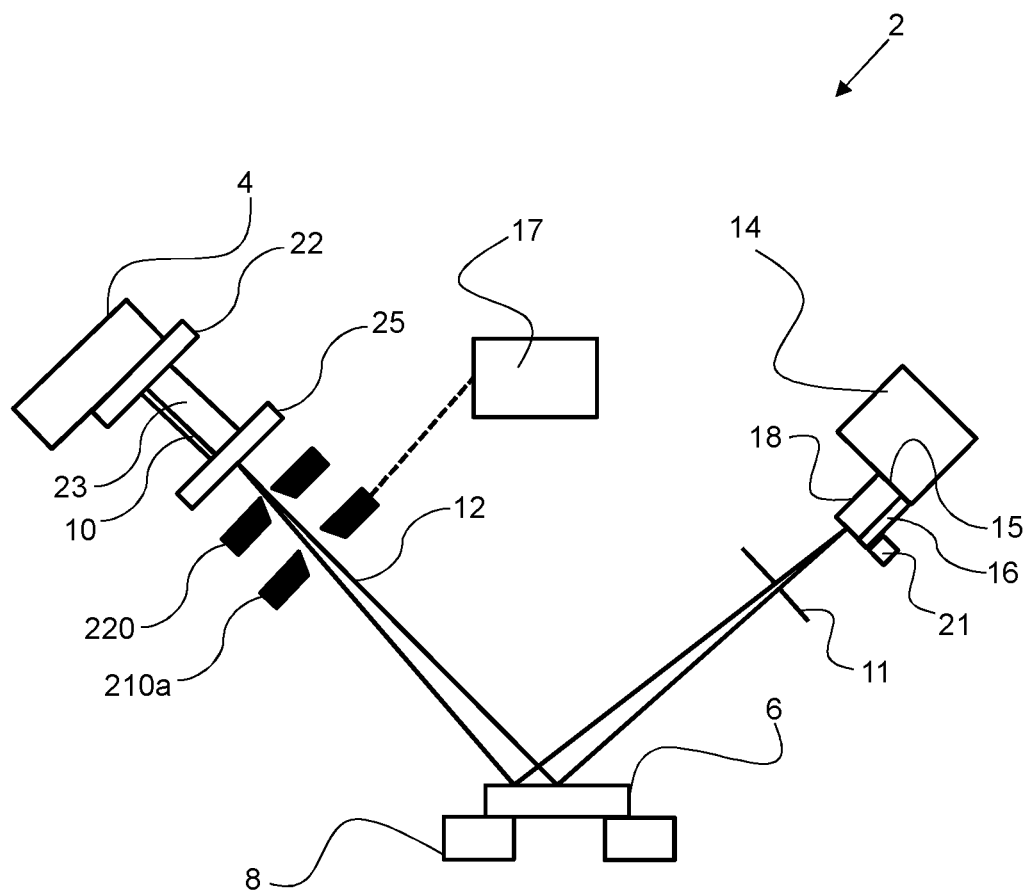
FIG. 7 is a schematic diagram of an X-ray diffraction apparatus, according to an alternative embodiment to FIG. 1.

FIG. 7 is a schematic diagram showing an X-ray diffractometer according to another exemplary embodiment. This is a variant of the embodiment illustrated in FIG. 1. With the exception of the differences described below, this embodiment is identical to that of FIG. 1. For the sake of brevity, the description of the common features will not be repeated.

In FIG. 1, the further slit (non-adjustable slit 220) was positioned in the beam path between the adjustable slit 210 and the sample 6. This allowed the non-adjustable slit 220 to function as an anti-scatter slit, blocking scatter generated by the adjustable slit 210. In particular, it allowed the non-adjustable slit 220 to block scatter from the adjustable slit 210 when the adjustable slit was set to the first width or the second width, wherein the adjustable slit was limiting the divergence of the incident beam. Since the adjustable slit 210 would typically be used at its first and second widths at low incident angles, this can allow the apparatus of FIG. 1 to provide good control of parasitic scatter at low incident angles.

In contrast, in FIG. 7, the order of the adjustable slit and the further (non-adjustable) slit is reversed. In other words, the adjustable slit 210*a* is positioned in the incident beam path between the X-ray tube 4 and the sample 6; and the further slit (non-adjustable slit 220) is positioned in the incident beam path between the X-ray tube 4 and the adjustable slit 210*a*. Similarly to the embodiment of FIG. 1, the controller 17 controls the adjustable slit 210*a*.

The apparatus of FIG. 7 can function in a similar way to that of FIG. 1. With the adjustable slit 210*a* set to the first and second widths, the adjustable slit 210*a* limits the beam divergence. With the adjustable slit 210*a* set to the third width, the further slit (non-adjustable slit 220) becomes the divergence-limiting component. However, now, the adjustable slit 210*a* can function as an anti-scatter slit, blocking parasitic scatter from the non-adjustable slit 220. In particular, the adjustable slit 210*a* can function as an anti-scatter slit when it is set to the third width, wherein the non-adjustable slit 220 is limiting the divergence of the incident beam. Since the adjustable slit 210*a* will typically be used at its third width at high incident angles (as discussed already above), this can allow the apparatus of FIG. 7 to provide good control of parasitic scatter at high incident angles.

The apparatus of FIG. 1 or FIG. 7 can therefore be chosen depending on whether it is more important, in a particular application scenario, to control parasitic scatter at low or high incident angles. Alternatively or additionally, the choice may depend on whether other optical elements in the beam path influence the parasitic scatter.

In one embodiment, the controller 17 is pre-configured with information relating to the component configuration for different types of X-ray measurements. For example, the controller may be configured to conduct measurements in Bragg Brentano mode, SAXS mode, GISAXS mode, Thin Film Phase Analysis mode, Reflectometry mode etc. For each type of X-ray measurement, there may be a specific associated component configuration (including a definition of how the incident beam divergence should be controlled with the adjustable slit, and optionally the further slit). The user selects a measurement mode and the controller determines which configuration is appropriate by determining which configuration is associated with the selected measurement mode. The controller then sends a control signal to one or more actuators causing the actuators to move the components to that configuration. In some measurement modes, it may be possible to use multiple configurations. For example, when using Bragg Brentano geometry, measurements may be carried out with fixed illumination length, or with fixed divergence, or a mix of both (for example, at different incident angles). The user may be prompted to select which type of measurement is desired, or the controller may choose based on other conditions and configure the adjustable slit (and optionally the further slit) accordingly.

In another embodiment, the controller is pre-configured to select the component configuration based on the type of sample to be analysed. For example, the user may input information identifying the type of sample to be analysed. The controller compares this information to a database to determine the most suitable component configuration. The database provides information about what type of scan is required for different materials, and the appropriate component configuration for that scan.

In an embodiment, the component configuration is changed during a batch of measurements. In this embodiment, the sample holder comprises multiple containers. Each container holds a different sample. The samples may be of different materials. During a measurement, the sample holder is controlled to position a single container in the incident X-ray beam path. The controller controls the sample holder to move the containers, in order to exchange the container arranged in the X-ray beam path for another container. In this way, X-ray measurements are carried out on a batch of samples, without user intervention. The controller is also configured to change the component configuration, so that the configuration can be changed during a batch of measurements, without user intervention.

The skilled person will understand that variations of the embodiments discussed above may be provided. For example, in alternative embodiments the following may be provided.

In some embodiments, as mentioned already above, the further slit is not necessary and the incident beam divergence can be controlled by the adjustable slit alone. When present, it is not essential that the further slit is a non-adjustable slit, having a fixed width. In some embodiments, it may be a further adjustable slit. This can allow a further degree of control over scatter and/or the angular divergence of the incident beam. The controller may be configured to control the width of the further adjustable slit in accordance with the width of the (first) adjustable slit, in accordance with the incident angle, or both. For example, the controller may be configured to increase the width of the further adjustable slit as the width of the (first) adjustable slit increases. The (first) adjustable slit may limit the divergence of the incident beam and the further adjustable slit may control parasitic scatter from the (first) adjustable slit, without limiting the divergence of the incident beam (at least at some widths of the first adjustable slit). This can allow scatter from the first adjustable slit to be controlled more effectively, because the further adjustable slit can be controlled to be relatively close to the incident beam, at each width of the first adjustable slit (that is, at each divergence angle of the incident beam).

In the embodiments described above, the non-adjustable further slit was provided by an opening in a solid plate of material. However, this is not essential. As will be familiar to those skilled in the art, other suitable types of slit exist, which do not comprise an opening in a solid plate of material.

In general, all of the other X-ray optics mentioned in the embodiments described above are optional. They may or may not be present in any given embodiment, depending on the application and/or the desired X-ray analysis to be conducted. This includes the beam conditioning unit 23 (including the flat graded multilayer 10 and the Soller slit collimator), the mask wheels 22 and 25, the first to fourth collimators, and the anti-scatter slit 11.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor or controller, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, and CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

The invention claimed is:

1. An X-ray analysis apparatus comprising:
an X-ray source (4) configured to generate X-rays;
a sample stage (8) configured to support a sample (6), the X-ray source and the sample stage being arranged so that X-rays generated by the X-ray source define an incident beam that irradiates the sample;
an adjustable slit (210) between the X-ray source and the sample;
a further slit (220), between the X-ray source and the adjustable slit, or between the adjustable slit and the sample; and
a controller (17) configured to control a width of the adjustable slit,
wherein the controller is configured to vary the width of the adjustable slit between a first width, a second width, and a third width, the third width being greater than the second width, the second width being greater than the first width, wherein
at the first width: the adjustable slit limits the divergence of the incident beam to a first divergence angle and thereby limits an area of the sample that is irradiated,
at the second width: the adjustable slit limits the divergence of the incident beam to a second divergence angle and thereby limits the area of the sample that is irradiated, and
at the third width: the adjustable slit does not limit the divergence of the incident beam; and
the further slit limits the divergence of the incident beam to a third divergence angle and thereby limits the area of the sample that is irradiated,
wherein the third divergence angle is greater than the second divergence angle, and the second divergence angle is greater than the first divergence angle.

2. The X-ray analysis apparatus of claim 1, wherein the further slit (220) is a non-adjustable slit.

3. The X-ray analysis apparatus of claim 1, wherein the further slit is adjustable.

4. The X-ray analysis apparatus of claim 1 further comprising a goniometer, wherein the X-ray source is mounted to the goniometer so as to be rotatable about an axis of the goniometer, to irradiate the sample at a range of different incident angles.

5. The X-ray analysis apparatus of claim 4, wherein the controller is configured to control the goniometer and the adjustable slit so that:
with the goniometer set to a first incident angle, the adjustable slit is set to the first width;
with the goniometer set to a second incident angle, the adjustable slit is set to the second width; and
with the goniometer set to a third incident angle, the adjustable slit is set to the third width, the third incident angle being greater than the second incident angle, and the second incident angle being greater than the first incident angle.

6. The X-ray analysis apparatus of claim 5, wherein the controller is configured to control the width of the adjustable slit such that, over a range of incident angles of the goniometer, the incident beam irradiates a constant area of the sample.

7. The X-ray analysis apparatus of claim 6, wherein the further slit (220) is a non-adjustable slit.

8. The X-ray analysis apparatus of claim 6, wherein the further slit is adjustable.

9. The X-ray analysis apparatus of claim 6, further comprising an X-ray detector (14) arranged to receive X-rays from the sample (6) and configured to produce an output signal measuring the intensity of the received X-rays,
wherein the controller is configured to receive the output signal from the X-ray detector and is configured to normalise the measured intensity, by:
performing a first normalisation calculation based on the width of the adjustable slit, when the adjustable slit is set to the first width or the second width; and
performing a second normalisation calculation based on a width of the further slit, when the adjustable slit is set to the third width.

10. The X-ray analysis apparatus of claim 4, wherein the controller is configured to control the width of the adjustable slit such that, over a range of incident angles of the goniometer, the incident beam irradiates a constant area of the sample.

11. The X-ray analysis apparatus of claim 1, further comprising an X-ray detector (14) arranged to receive X-rays from the sample (6) and configured to produce an output signal measuring the intensity of the received X-rays,
wherein the controller is configured to receive the output signal from the X-ray detector and is configured to normalise the measured intensity, by:
performing a first normalisation calculation based on the width of the adjustable slit, when the adjustable slit is set to the first width or the second width; and
performing a second normalisation calculation based on a width of the further slit, when the adjustable slit is set to the third width.

12. The X-ray analysis apparatus of claim 1, wherein the X-ray analysis apparatus is configured for X-ray fluorescence measurements.

13. The X-ray analysis apparatus of claim 1, wherein the X-ray analysis apparatus is a diffractometer.

14. A method of X-ray analysis, using an apparatus comprising:
an X-ray source (4) configured to generate X-rays;
a sample stage (8) configured to support a sample (6), the X-ray source and the sample stage being arranged so that X-rays generated by the X-ray source define an incident beam that irradiates the sample;
an adjustable slit (210) between the X-ray source and the sample;
a further slit (220), between the X-ray source and the adjustable slit, or between the adjustable slit and the sample; and
a controller (17) configured to control a width of the adjustable slit,
the method comprising:
setting (620), by the controller, the adjustable slit to a first width, at which the adjustable slit limits the divergence of the incident beam to a first divergence angle and thereby limits an area of the sample that is irradiated;
setting (620), by the controller, the adjustable slit to a second width, at which the adjustable slit limits the divergence of the incident beam to a second divergence angle and thereby limits an area of the sample that is irradiated; and setting, by the controller, the adjustable slit to a third width, at which the adjustable slit does not limit the divergence of the incident beam, and the further slit limits the divergence of the incident beam to a third divergence angle and thereby limits an area of the sample that is irradiated,
wherein the third width is greater than the second width, and the second width is greater than the first width, and
wherein the third divergence angle is greater than the second divergence angle, and the second divergence angle is greater than the first divergence angle.

15. A method of X-ray analysis, using an apparatus comprising:
an X-ray source (4) configured to generate X-rays;
a sample stage (8) configured to support a sample (6), the X-ray source and the sample stage being arranged so that X-rays generated by the X-ray source define an incident beam that irradiates the sample;
an adjustable slit (210) between the X-ray source and the sample;
a goniometer, wherein the X-ray source is mounted to the goniometer so as to be rotatable about an axis of the goniometer, to irradiate the sample at a range of different incident angles; and
a controller (17) configured to control the goniometer and a width of the adjustable slit,
the method comprising:
with the goniometer set (610) to a first incident angle, setting (620), by the controller, the adjustable slit to a first width, at which the adjustable slit limits the divergence of the incident beam to a first divergence angle and thereby limits an area of the sample that is irradiated;
with the goniometer set (610) to a second incident angle, setting (620), by the controller, the adjustable slit to a second width, at which the adjustable slit limits the divergence of the incident beam to a second divergence angle and thereby limits an area of the sample that is irradiated;
with the goniometer set (665) to a third incident angle, setting, by the controller, the adjustable slit to a third width, at which the adjustable slit limits the divergence of the incident beam to a third divergence angle and thereby limits an area of the sample that is irradiated; and
with the goniometer set (665) to a fourth incident angle, setting, by the controller, the adjustable slit to the third width,
wherein the third width is greater than the second width, and the second width is greater than the first width,
wherein the third divergence angle is greater than the second divergence angle, and the second divergence angle is greater than the first divergence angle, and
wherein the fourth incident angle is greater than the third incident angle, the third incident angle is greater than the second incident angle, and the second incident angle is greater than the first incident angle.

16. The method of claim 15, wherein the controller controls the width of the adjustable slit such that, over a range of incident angles from the first incident angle to the second incident angle, the incident beam irradiates a constant area of the sample.

17. The method of claim 16, wherein the apparatus comprises a further slit (220) positioned between the adjustable slit and the sample so that the incident beam passes through the further slit but the further slit does not limit the divergence of the incident beam.

18. The method of claim 15, wherein the apparatus comprises a further slit (220) positioned between the adjustable slit and the sample so that the incident beam passes through the further slit but the further slit does not limit the divergence of the incident beam.

\* \* \* \* \*